US012663307B2

(12) United States Patent
Liu et al.

(10) Patent No.: US 12,663,307 B2
(45) Date of Patent: Jun. 23, 2026

(54) SYSTEM AND METHOD FOR AUTOMATIC DETECTION OF MICROSEISMIC REFLECTIONS IN DISTRIBUTED ACOUSTIC SENSING DATA

(71) Applicant: CHEVRON U.S.A. INC., San Ramon, CA (US)

(72) Inventors: Youfang Liu, Houston, TX (US); Ivan Lim Chen Ning, Houston, TX (US); Kurt T. Nihei, Houston, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 269 days.

(21) Appl. No.: 18/436,273

(22) Filed: Feb. 8, 2024

(65) Prior Publication Data

US 2025/0258034 A1     Aug. 14, 2025

(51) Int. Cl.
*G01V 1/28*          (2006.01)
*E21B 47/00*         (2012.01)
(Continued)

(52) U.S. Cl.
CPC ............. *G01H 9/002* (2013.01); *E21B 47/00* (2013.01); *E21B 47/135* (2020.05); *G01H 9/004* (2013.01); *G01V 1/282* (2013.01)

(58) Field of Classification Search
CPC .... G01V 1/288; G01V 2210/123; G01V 1/28; G01V 11/007; G01V 1/42; G01V 1/40;
(Continued)

(56) References Cited

U.S. PATENT DOCUMENTS 5,479,440 A * 12/1995 Esfahani ............ H03H 21/0012
                                                         708/321
6,263,284 B1 * 7/2001 Crider .................... G01V 1/286
                                                          702/14
(Continued)

FOREIGN PATENT DOCUMENTS

CA          2747426 A1 * 7/2010  ............... G01V 1/28
CN       119861414 A  * 4/2025  ............. G01V 1/364
(Continued)

OTHER PUBLICATIONS

Jie, Near-Surface Characterization Using High-Speed Train Seismic Data Recorded by a Distributed Acoustic Sensing Array (Year: 2022).*
(Continued)

*Primary Examiner* — Andre J Allen
(74) *Attorney, Agent, or Firm* — Marie L. Clapp

(57)          ABSTRACT
A method is described for automatically detecting shear-wave (S-wave) microseismic reflections using distributed acoustic sensing (DAS). The method includes obtaining raw DAS data; performing passive seismic event detection and phase picking; extracting a passive seismic event based on the passive seismic event phase picks to generate a seismic S-wave event gather; reducing noise in the raw DAS data; using the passive seismic S-wave event gather and the passive seismic event phases to identify an apex of a passive seismic S-wave event in the denoised DAS dataset and dividing it into two portions based on the apex; dip filtering the two portions to remove the direct arrival of the passive seismic S-wave events to generate a dip-filtered gather; and generating an S-wave microseismic reflection gather based on the dip-filtered gather.

12 Claims, 7 Drawing Sheets

(51) Int. Cl.
    *E21B 47/135*      (2012.01)
    *G01H 9/00*       (2006.01)

(58) Field of Classification Search
    CPC ........... G01V 1/306; G01V 2210/1234; G01V 2210/646; G01V 1/30; G01V 1/20; G01V 1/303; G01V 2210/6246; G01V 3/12; G01V 1/181; G01V 3/38; G01V 1/284; G01V 2210/65; G01V 1/282; G01V 2210/1429; G01V 2210/32; G01V 11/00; G01V 2210/6163; G01V 2210/62; G01V 2210/6224; G01V 3/16; G01V 2210/6244; G01V 2210/624; G01V 1/38; G01V 1/36; G01V 2210/1425; G01V 1/48; G01V 2210/6222; G01V 2210/1427; G01V 1/364; G01V 1/3808; G01V 1/52; G01V 2210/121; G01V 1/305; G01V 1/308; G01V 1/366; G01V 1/18; G01V 1/50; G01V 2210/169; G01V 1/22; G01V 1/226; G01V 2210/6122; G01V 1/362; G01V 2210/614; G01V 1/01; G01V 1/247; G01V 1/301; G01V 1/3852; G01V 1/34; G01V 1/166; G01V 2210/1236; G01V 2210/1295; G01V 2210/1423; G01V 2210/43; G01V 1/003; G01V 1/186; G01V 1/523; G01V 2210/144; G01V 2210/667; G01V 1/168; G01V 1/345; G01V 2210/21; G01V 1/00; G01V 1/46; G01V 2210/125; G01V 2210/1299; G01V 2210/161; G01V 2210/679; G01V 1/208; G01V 1/32; G01V 1/3817; G01V 1/44; G01V 11/002; G01V 2210/324; G01V 2210/3246; G01V 2210/66; G01V 2210/30; G01V 2210/52; G01V 2210/6242; G01V 2210/67; G01V 8/24; G01V 1/133; G01V 1/368; G01V 2200/12; G01V 2210/1214; G01V 2210/1293; G01V 2210/58; G01V 2210/6161; G01V 2210/6169; G01V 2210/63; G01V 2210/642; G01V 2210/675; G01V 7/00; G01V 1/02; G01V 1/189; G01V 1/223; G01V 20/00; G01V 2001/526; G01V 2210/322; G01V 1/005; G01V 1/162; G01V 1/184; G01V 1/302; G01V 1/3843; G01V 2200/16; G01V 2210/34; G01V 2210/51; G01V 2210/53; G01V 2210/612; G01V 2210/6226; G01V 2210/673; G01V 2210/74; G01V 3/26; G01V 3/28; G01V 7/06; G01V 1/001; G01V 1/08; G01V 1/104; G01V 1/13; G01V 1/24; G01V 1/307; G01V 1/325; G01V 1/375; G01V 2003/086; G01V 2200/14; G01V 2210/16; G01V 2210/165; G01V 2210/20; G01V 2210/38; G01V 2210/41; G01V 2210/44; G01V 2210/56; G01V 2210/57; G01V 2210/6248; G01V 2210/64; G01V 2210/70; G01V 3/081; G01V 1/047; G01V 1/157; G01V 1/16; G01V 1/201; G01V 1/26; G01V 1/3826; G01V 1/3835; G01V 2001/207; G01V 2210/1232; G01V 2210/1297; G01V 2210/40; G01V 2210/48; G01V 2210/6124; G01V 2210/6165; G01V 2210/622; G01V 2210/632; G01V 8/00; G01V 8/16; E21B 49/00; E21B 43/26; E21B 43/16; E21B 43/00; E21B 47/00; E21B 47/107; E21B 47/14; E21B 49/008; E21B 47/06; E21B 47/0224; E21B 37/02; E21B 47/07; E21B 47/095; E21B 47/085; E21B 41/0064; E21B 43/119; E21B 41/00; E21B 43/162; E21B 43/2406; E21B 43/267; E21B 47/12; E21B 47/135; E21B 49/006; E21B 2200/20; E21B 33/12; E21B 33/134; E21B 43/116; E21B 47/002; E21B 47/113; E21B 47/18; E21B 7/04; E21B 2200/22; E21B 44/00; E21B 44/005; E21B 44/02; E21B 47/01; E21B 47/013; E21B 49/003; E21B 7/06; E21B 43/2607; E21B 47/005; G01H 9/004; G01H 9/002; G01H 9/00; G01H 9/006
    See application file for complete search history.

(56)            References Cited

U.S. PATENT DOCUMENTS

| | | | |
|---|---|---|---|
| 10,401,519 B2 * | 9/2019 | Willis | G01V 1/364 |
| 10,444,391 B2 * | 10/2019 | Ellmauthaler | G01V 1/42 |
| 11,555,939 B2 * | 1/2023 | Wilson | G01V 1/48 |
| 2016/0061976 A1 * | 3/2016 | Hu | G01V 1/30 |
| | | | 367/7 |
| 2017/0212273 A1 * | 7/2017 | Andrienko | G01V 8/24 |
| 2023/0251396 A1 | 8/2023 | Iqbal | |

FOREIGN PATENT DOCUMENTS

| | | | | | |
|---|---|---|---|---|---|
| CN | 120491180 A | * | 8/2025 | | |
| WO | WO-2024107815 A1 | * | 5/2024 | | G01V 1/288 |
| WO | WO-2025122685 A1 | * | 6/2025 | | G01V 1/226 |
| WO | WO-2025250172 A1 | * | 12/2025 | | G01V 1/308 |

OTHER PUBLICATIONS

Grechka, Vladimir, et al.; "High-Resolution Microseismic Imaging"; (Oct. 2017), The Leading Edge, Special Section: Microseismic, pp. 822-828.

Lim Chen Ning, Ivan, et al., "Automation of Distributed Acoustic Sensing Passive Seismic Processing"; (2023), 84th EAGE Annual Conference & Exhibition, pp. 1-5.

Lim Chen Ning, Ivan, et al., "Automation of Passive Seismic Processing via Machine Learning and Physics-Informed Methods"; (2022), Second International Meeting for Applied Geoscience & Energy, Society of Exploration Geophysicists and in the American Association of Petroleum Geologists, pp. 1521-1525.

Ma, Yuanyuan, et al.; "Characterizing Hydraulic Fracture Growth Using Distributed Acoustic Sensing-Recorded Microseismic Reflections"; (2023), Geophysics, vol. 88, No. 6, pp. WC47-WC57.

Stanek, Frantisek, et al.; "Fracture Imaging Using DAS-Recorded Microseismic Events"; (Jul. 2022), Frontiers in Earth Science, vol. 10, Article 907749, pp. 1-9.

Zhu, Weiqiang, et al.; "PhaseNet: A Deep-Neural-Network-Based Seismic Arrival-Time Picking Method"; (2019), Geophysical Journal International, vol. 216, pp. 261-273.

PCT International Search Report and Written Opinion mailed on Apr. 15, 2025, issued in International Application No. PCT/US2025/013362, filed on Jan. 28, 2025, 15 pages.

Yang. 'Near-Surface Seismic Characterization and Monitoring: A Dense Seismic Acquisition Perspective. In: a thesis submitted to the Faculty and the Board of Trustees of the Colorado School of Mines in partial fulfillment of the requirement s for the degree of Doctor of Philosophy, 2023, [shortened pp. i-iv, 9-15, 26-36, 47-50, 74-85], [online] [retrieved on Apr. 2, 2025] Retrieved from the Internet [

(56)         References Cited

OTHER PUBLICATIONS

URL: https://repository.mines.edu/entities/publication/f6278a0a-a66d-4f45-bd30-b7d8a78059c5 ].

* cited by examiner

300

30 Obtain raw DAS data

31 Passive seismic event detection and phase picking

32 Identify passive S-waves

33 Denoising

34 Use the S-wave picks to identify the apex of arrival and separate into portions on either side of the apex to identify dip of direct arrival 35 Perform dip filtering to identify conflicting dips of reflections 36 Output S-wave reflections

SYSTEM AND METHOD FOR AUTOMATIC DETECTION OF MICROSEISMIC REFLECTIONS IN DISTRIBUTED ACOUSTIC SENSING DATA

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

The disclosed embodiments relate generally to techniques for seismic data processing. In particular, the disclosed embodiments relate to automatic detection of microseismic shear wave (S-wave) events in distributed acoustic sensing (DAS) data.

BACKGROUND

Seismic exploration involves surveying subterranean geological media for hydrocarbon deposits. A survey typically involves deploying seismic sources and seismic sensors at predetermined locations. The sources generate seismic waves, which propagate into the geological medium creating pressure changes and vibrations. Variations in physical properties of the geological medium give rise to changes in certain properties of the seismic waves, such as their direction of propagation and other properties. Alternatively, rather than having active seismic sources to generate seismic waves, a passive seismic survey may use ambient seismic sources such as but not limited to earthquakes, rock fracturing, and/or environmental sources (e.g., vehicle traffic, ocean waves, and the like). When these ambient seismic sources are weak, such as rock fracturing, they may be considered microseismic sources emitting microseismic energy.

Portions of the seismic waves reach the seismic sensors. Some seismic sensors are sensitive to pressure changes (e.g., hydrophones), others to particle motion (e.g., geophones), and industrial surveys may deploy one type of sensor or both. In response to the detected seismic waves, the sensors generate corresponding electrical signals, known as traces, and record them in storage media as seismic data. Seismic data will include a plurality of "shots" (individual instances of the seismic source being activated), each of which are associated with a plurality of traces recorded at the plurality of sensors.

An alternative seismic sensor may include fiber-optic cables. Fiber-optic cables may be deployed in a borehole drilled through the earth's subsurface, along the earth's surface, on a seabed, and the like. FIG. 1 illustrates a fiber-optic cable 12 attached to an interrogator 10. A laser pulse 14 propagates through the fiber-optic cable 12, shown as light stream 16. The light stream 16 sends information to interrogator 10. An acoustic signal 18 encountering the fiber-optic cable 12 is recorded as a change in strain or strain-rate along the cable and may be considered to be a seismic event.

Seismic data is processed to create seismic images that can be interpreted to identify subsurface geologic features including hydrocarbon deposits. The ability to define the location of rock and fluid property changes in the subsurface is crucial to our ability to make the most appropriate choices for purchasing materials, operating safely, and successfully completing projects. Project cost is dependent upon accurate prediction of the position of physical boundaries within the Earth. Decisions include, but are not limited to, budgetary planning, obtaining mineral and lease rights, signing well commitments, permitting rig locations, designing well paths and drilling strategy, preventing subsurface integrity issues by planning proper casing and cementation strategies, and selecting and purchasing appropriate completion and production equipment.

There exists a need for methods of processing DAS data in order to identify microseismic reflections.

SUMMARY

In accordance with some embodiments, a method of automatically detecting shear-wave (S-wave) microseismic reflections using distributed acoustic sensing (DAS) is disclosed. The method includes obtaining raw DAS data collected for a subsurface volume of interest; performing passive seismic event detection and phase picking on the raw DAS data to identify passive seismic events and passive seismic event phases; extracting a passive seismic event based on the passive seismic event phase picks to generate a seismic S-wave event gather; reducing noise in the raw DAS data to generate a denoised DAS dataset; using the passive seismic S-wave event gather and the passive seismic event phases to identify an apex of a passive seismic S-wave event in the denoised DAS dataset and dividing the passive seismic S-wave event in the denoised DAS dataset into two portions based on the apex; identifying a dip of a direct arrival of the passive seismic S-wave event gather in each of the two portions; dip filtering the two portions to remove the direct arrival of the passive seismic S-wave events to generate a dip-filtered gather; generating an S-wave microseismic reflection gather based on the dip-filtered gather; and displaying the S-wave microseismic reflection gather on a graphical display.

In another aspect of the present invention, to address the aforementioned problems, some embodiments provide a non-transitory computer readable storage medium storing one or more programs. The one or more programs comprise instructions, which when executed by a computer system with one or more processors and memory, cause the computer system to perform any of the methods provided herein.

In yet another aspect of the present invention, to address the aforementioned problems, some embodiments provide a computer system. The computer system includes one or more processors, memory, and one or more programs. The one or more programs are stored in memory and configured to be executed by the one or more processors. The one or more programs include an operating system and instructions that when executed by the one or more processors cause the computer system to perform any of the methods provided herein.

BRIEF DESCRIPTION OF THE DRAWINGS

Like reference numerals refer to corresponding parts throughout the drawings.

DETAILED DESCRIPTION OF EMBODIMENTS

Described below are methods, systems, and computer readable storage media that provide a manner of detecting microseismic shear wave (S-wave) reflections in distributed acoustic sensing (DAS) data. These embodiments are designed to identify microseismic reflections automatically without the need for manual picking, making them more efficient and accurate than conventional methods.

Reference will now be made in detail to various embodiments, examples of which are illustrated in the accompanying drawings. In the following detailed description, numerous specific details are set forth in order to provide a thorough understanding of the present disclosure and the embodiments described herein. However, embodiments described herein may be practiced without these specific details. In other instances, well-known methods, procedures, components, and mechanical apparatus have not been described in detail so as not to unnecessarily obscure aspects of the embodiments.

Figure 1:
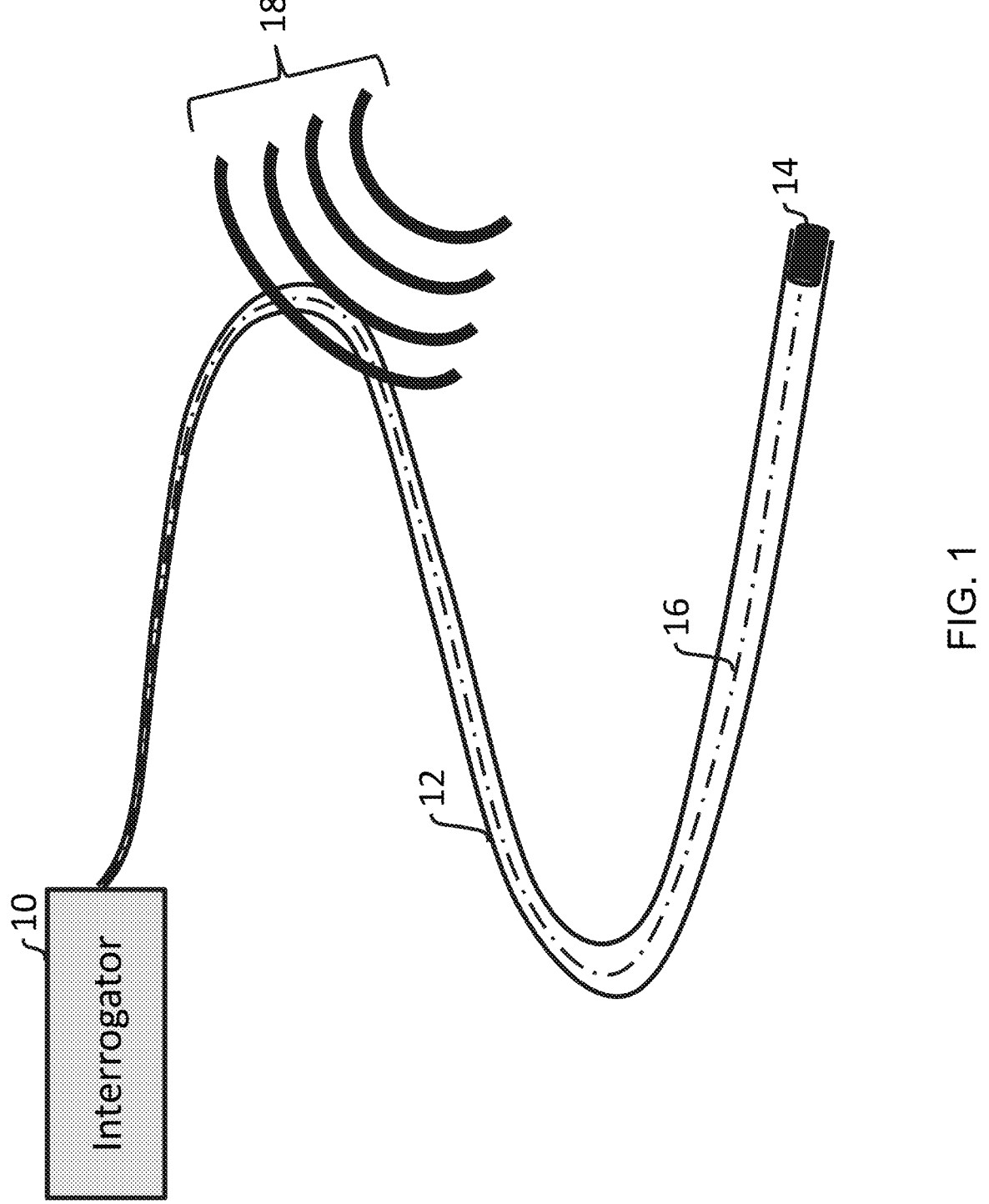
FIG. 1 is a simple diagram of a distributed acoustic sensing (DAS) system.
Figure 2:
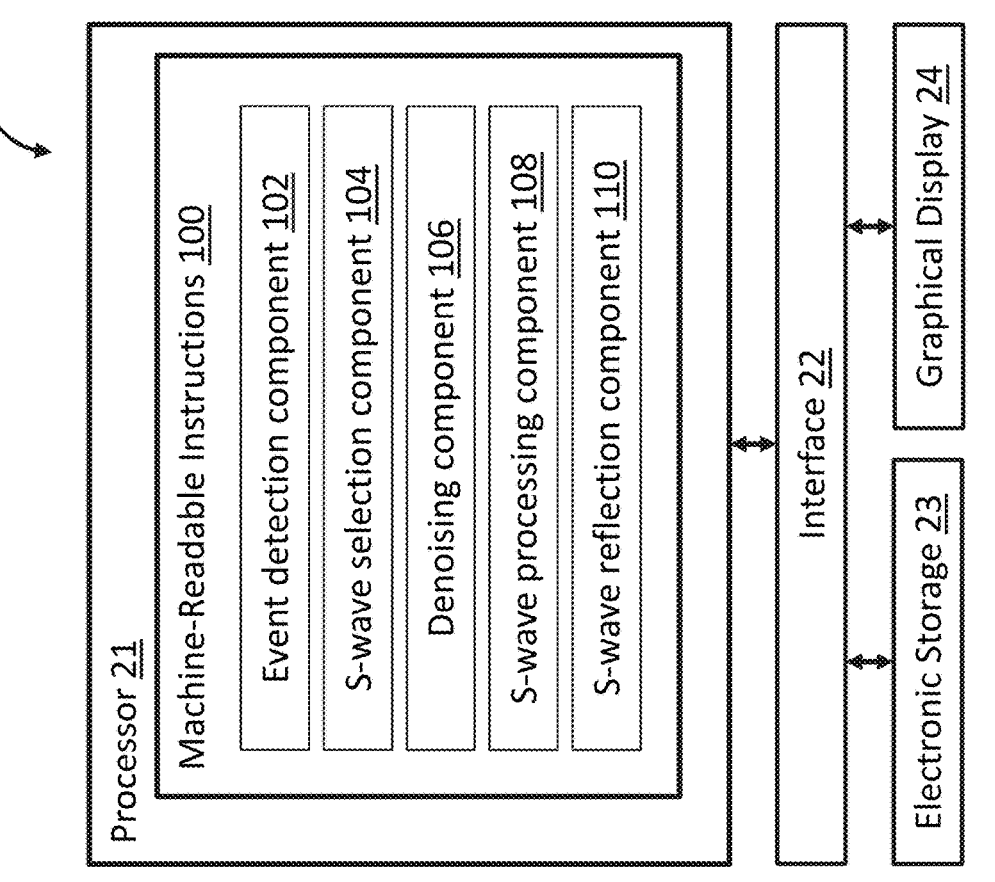
FIG. 2 illustrates an example system for identifying and displaying S-wave reflections from DAS data.

The methods and systems of the present disclosure may be implemented by a system and/or in a system, such as a system 20 shown in FIG. 2. The system 20 may include one or more of a processor 21, an interface 22 (e.g., bus, wireless interface), an electronic storage 23, a graphical display 24, and/or other components. The processor 21 is configured to receive raw distributed acoustic data (DAS) data and produce images of microseismic reflections.

The electronic storage 23 may be configured to include electronic storage medium that electronically stores information. The electronic storage 23 may store software algorithms, information determined by the processor 21, information received remotely, and/or other information that enables the system 20 to function properly. For example, the electronic storage 23 may store information relating to input DAS data, and/or other information. For example, the electronic storage 23 may store information relating to output S-wave reflections, and/or other information. The electronic storage media of the electronic storage 23 may be provided integrally (i.e., substantially non-removable) with one or more components of the system 20 and/or as removable storage that is connectable to one or more components of the system 20 via, for example, a port (e.g., a USB port, a Firewire port, etc.) or a drive (e.g., a disk drive, etc.). The electronic storage 23 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 23 may include one or more non-transitory computer readable storage medium storing one or more programs. The electronic storage 23 may be a separate component within the system 20, or the electronic storage 23 may be provided integrally with one or more other components of the system 20 (e.g., the processor 21). Although the electronic storage 23 is shown in FIG. 2 as a single entity, this is for illustrative purposes only. In some implementations, the electronic storage 23 may comprise a plurality of storage units. These storage units may be physically located within the same device, or the electronic storage 23 may represent storage functionality of a plurality of devices operating in coordination.

The graphical display 24 may refer to an electronic device that provides visual presentation of information. The graphical display 24 may include a color display and/or a non-color display. The graphical display 24 may be configured to visually present information. The graphical display 24 may present information using/within one or more graphical user interfaces. For example, the graphical display 24 may present information relating to DAS data, S-wave reflections, and/or other information.

The processor 21 may be configured to provide information processing capabilities in the system 20. As such, the processor 21 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 21 may be configured to execute one or more machine-readable instructions 100 to facilitate identification of S-wave reflections in DAS data. The machine-readable instructions 100 may include one or more computer program components. The machine-readable instructions 100 may include an event detection component 102, a S-wave selection component 104, a denoising component 106, a S-wave processing component 108, a S-wave reflection component 110, and/or other computer program components.

It should be appreciated that although computer program components are illustrated in FIG. 2 as being co-located within a single processing unit, one or more of computer program components may be located remotely from the other computer program components. While computer program components are described as performing or being configured to perform operations, computer program components may comprise instructions which may program processor 21 and/or system 20 to perform the operation.

While computer program components are described herein as being implemented via processor 21 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

Referring again to machine-readable instructions 100, the event detection component 102 may be configured to identify passive seismic events using unsupervised machine learning techniques to associate picks from multiple sensors to the same passive seismic event. An example of an appropriate unsupervised machine learning technique is density-based clustering. It may use a convolutional neural network trained to pick the arrival times of primary (P) and shear(S) waves from the DAS data, such as PhaseNet.

The S-wave selection component 104 may be configured to select passive S-waves based on phase picks. These are used to separate the two main dips of the seismic events.

The denoising component 106 may be configured to improve the signal-to-noise ratio of the DAS data.

The S-wave processing component 108 may be configured to process the data based on the selected S-waves.

The S-wave reflection component 110 may be configured to output the S-wave reflections.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 21 may be configured to execute one or more additional computer program components that may perform some or all of the functionality attributed to one or more of computer program components described herein.

Figure 3:
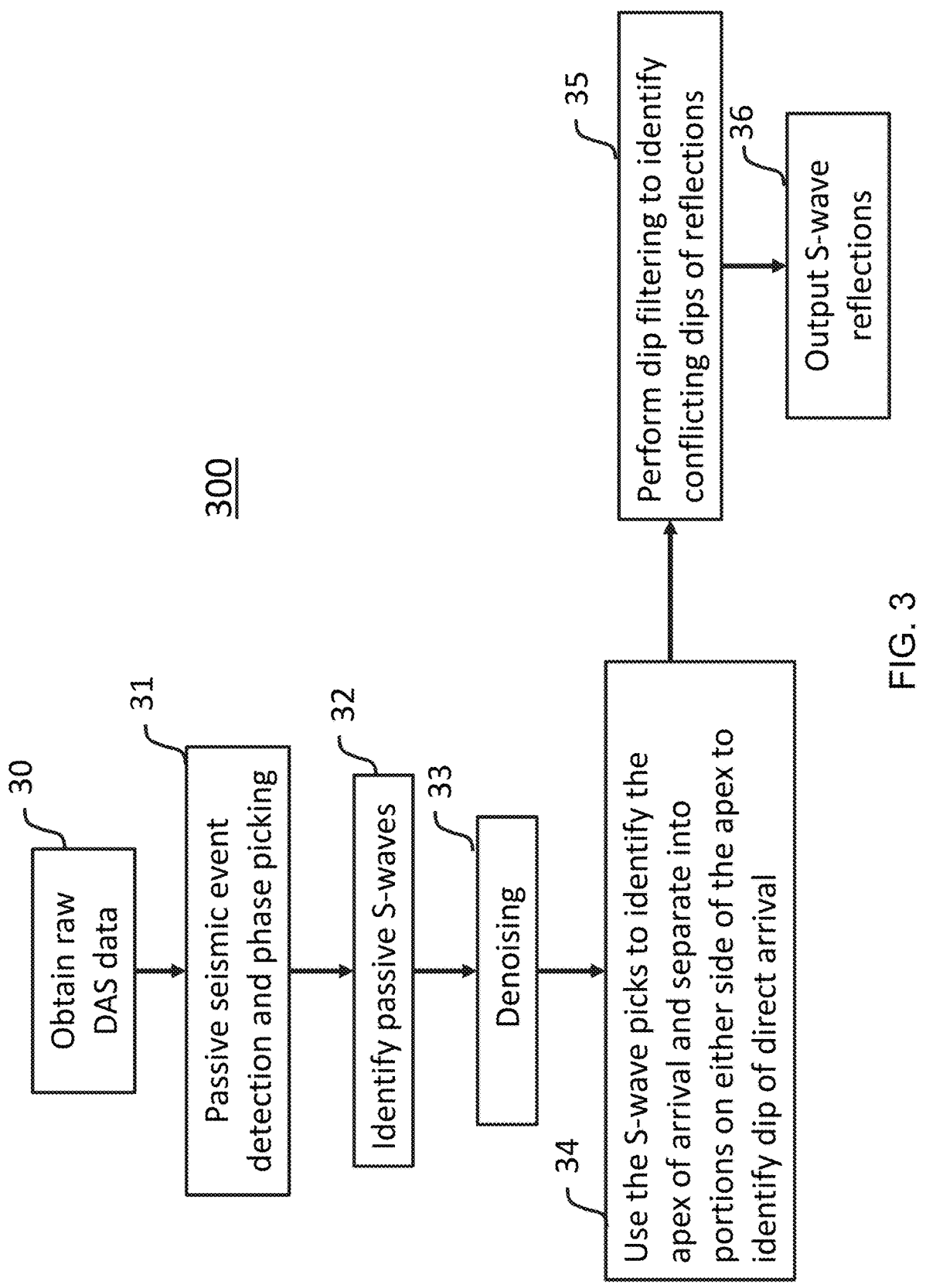
FIG. 3 illustrates an example method for identifying and displaying S-wave reflections from DAS data.

FIG. 3 illustrates an example process 300 for identifying S-wave microseismic reflections from DAS data. At step 30, the raw DAS data is obtained via fiber-optic cable. Raw DAS data may contain passive seismic events that travel directly from microseismic sources to the fiber-optic receivers as well as events that reflect from geologic interfaces in the geologic features near the fiber-optic cable. For example, the seismic energy may reflect off of fractures in the geologic formation.

At step 31, the process performs passive seismic event detection and phase picking in the raw DAS data. This may be done, by way of example and not limitation, using appropriate unsupervised machine learning techniques such as density-based clustering. It may use a convolutional neural network trained to pick the arrival times of primary (P) and shear(S) waves from the DAS data, such as PhaseNet. PhaseNet is a deep-neural-network-based phase picking algorithm designed to pick initial seismic phases from the raw data. This step then applies an unsupervised learning method for data clustering to group the associated P- and S-wave phases from the same seismic event. Clustering removes the false detections by neglecting the initial P- or S-wave arrivals which do not have their associated counterparts. The timing when microseismic events occurred in the continuous DAS recording will be identified after imposing additional physical constraints on picks after clustering.

At step 32, the process identifies passive seismic S-waves. Based on the timing determined from phases pickings in step 31, an individual gather of microseismic event which contains both P- and S-waves is extracted from the raw data for reflection detection.

At step 33, the signal-to-noise ratio of the raw DAS data is improved via denoising. The denoising technique, for example non-local mean filter, is used to further suppress the random noises in the extracted raw microseismic event. The denoised data will be used as the input in step 34.

At step 34, the apex of each S-wave event is found based on the phase picks. When the apex is identified, the event can be separated to left and right parts. The separation is conducted using the denoised data which contains less random noises. The left and right parts have two main dips based on the direct arrival of the S-wave. Based on the dips identified, the denoised DAS data from step 33 is dip filtered at step 35. By filtering out the two main dips, any conflicting dips become visible. The conflicting dips are the reflections.

At step 36, the S-wave reflections that were made visible in step 35 are output. They may be displayed on a graphical user interface and/or stored in electronic storage. In an embodiment, the S-wave reflections may be transformed into the frequency-wavenumber (f-k) domain and displayed on the graphical user interface and/or stored in electronic storage. These S-wave reflections may be used to characterize fractures in the geologic formations. This is of particular use in unconventional reservoirs such as shale and other tight rocks (rocks with minimal permeability). The identified S-wave reflections can be mapped from time domain to space domain. These reflections in space domain helps characterizing the fracture geometry (fracture height or width) between the microseismic sources and the fiber at the time of microseismic events.

Figure 4:
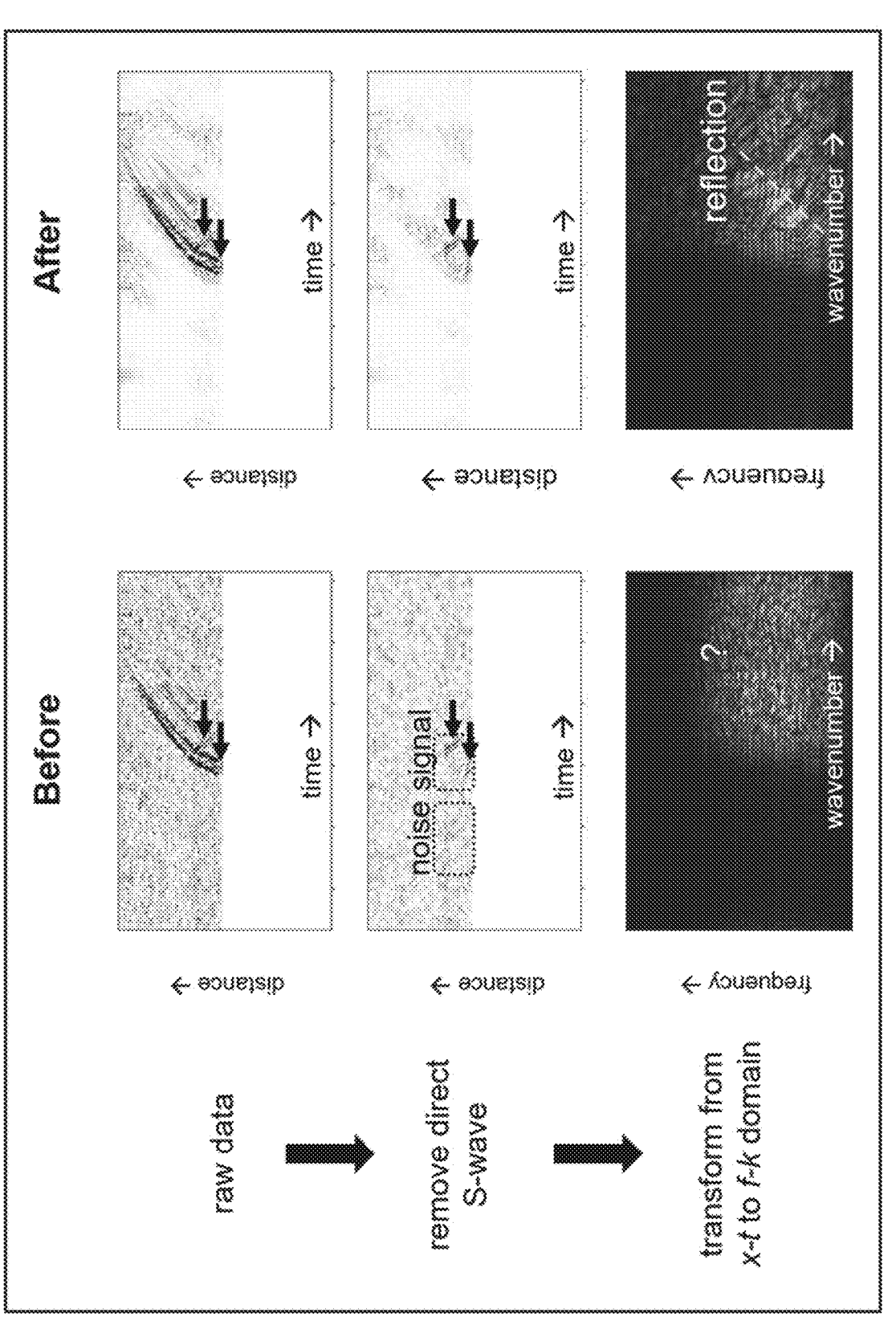
FIG. 4 illustrates example steps of a method for identifying and displaying S-wave reflections from DAS data.

FIG. 4 illustrates steps of process 300 using both raw (before panels on left) and denoised (after panels on right) DAS data. The top two panels show the raw DAS data. The middle two panels show the S-wave reflections after the direct S-wave arrivals have been dip-filtered out. The bottom two panels show the S-wave reflections in the frequency-wavenumber (f-k) domain. Note that the S-wave reflections are much clearer (in both x-t and f-k domains) when derived from the denoised data.

Figure 5:
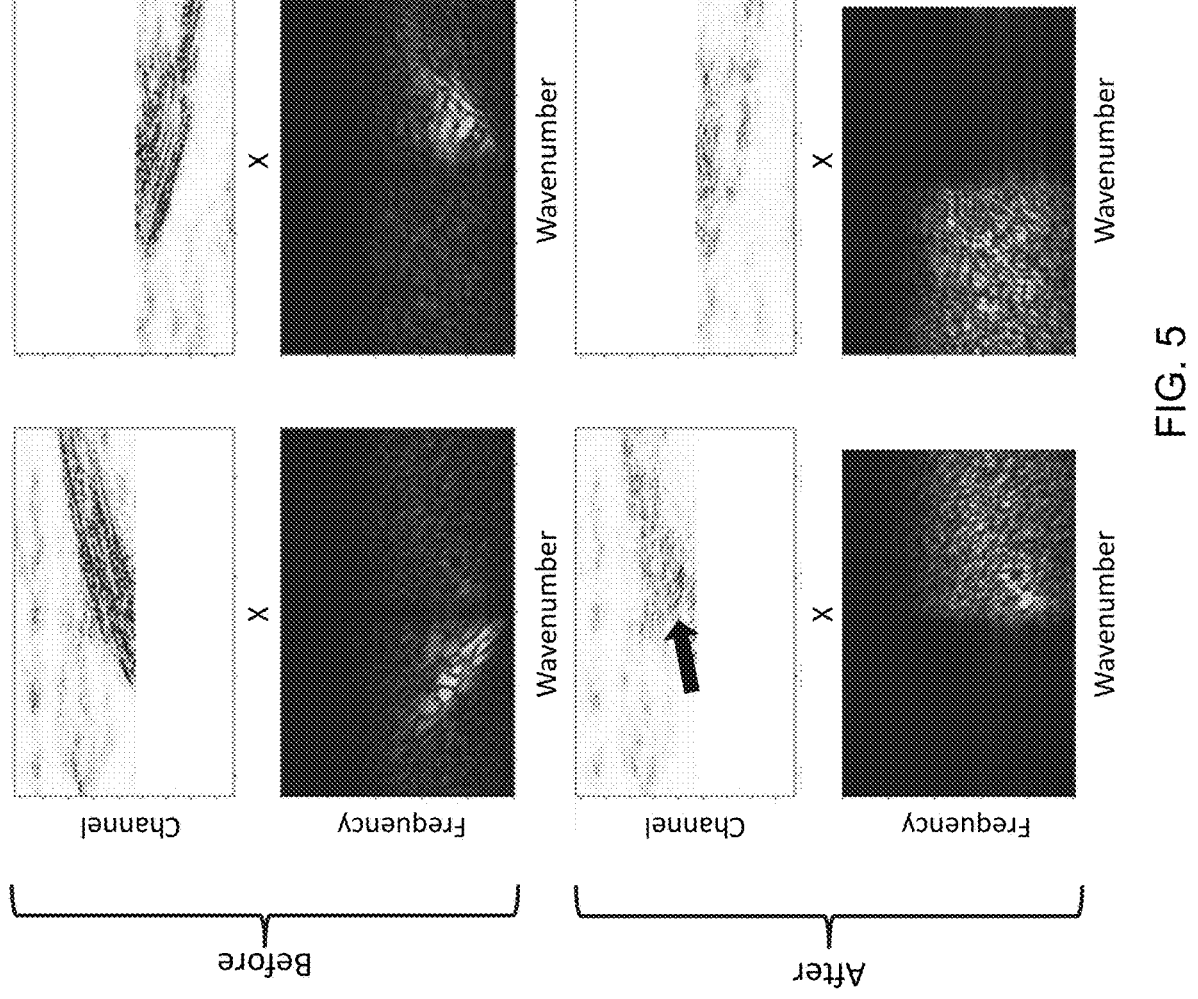
FIG. 5 shows a result of a method for identifying and displaying S-wave reflections from DAS data.
Figure 6:
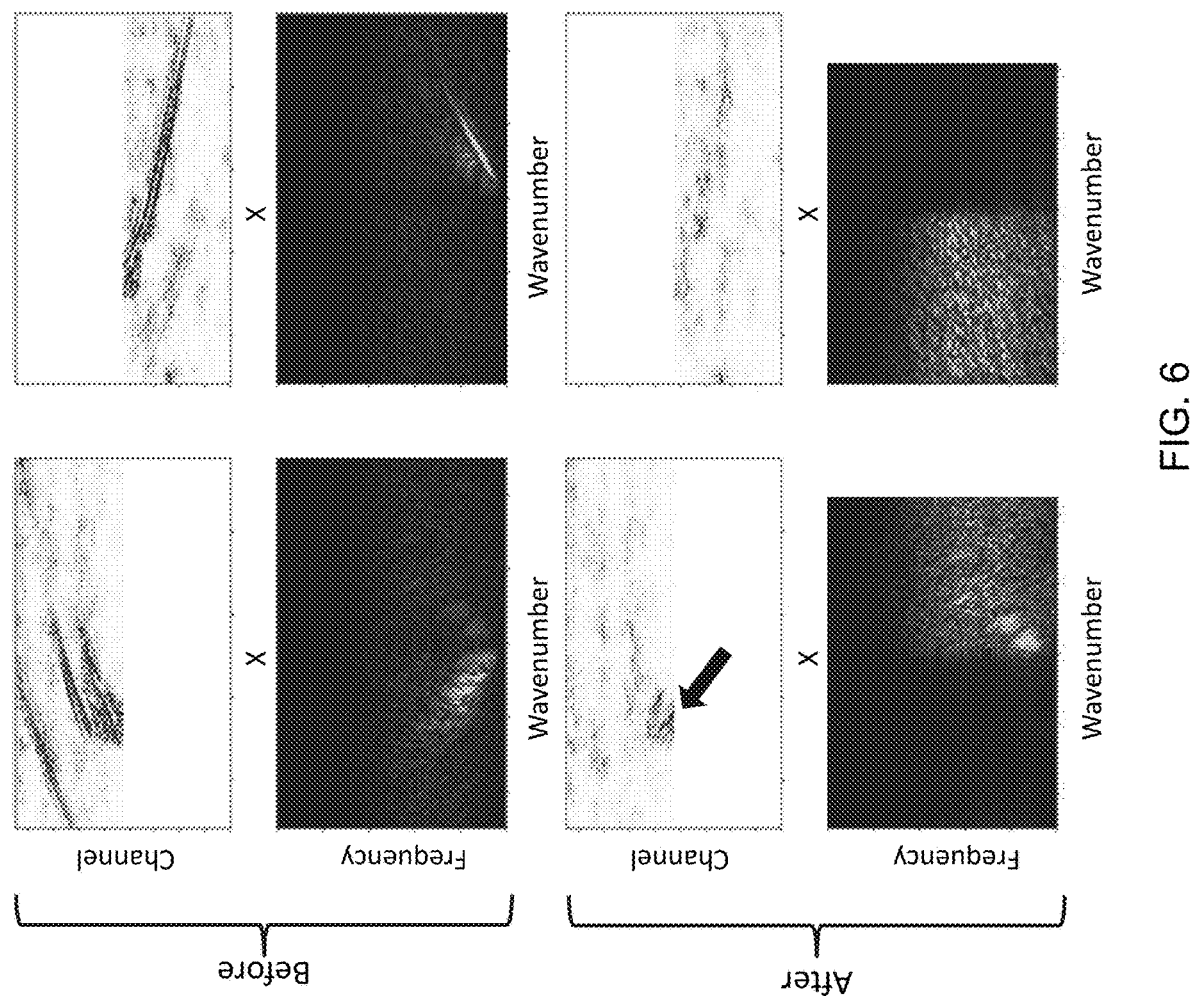
FIG. 6 shows a result of a method for identifying and displaying S-wave reflections from DAS data.
Figure 7:
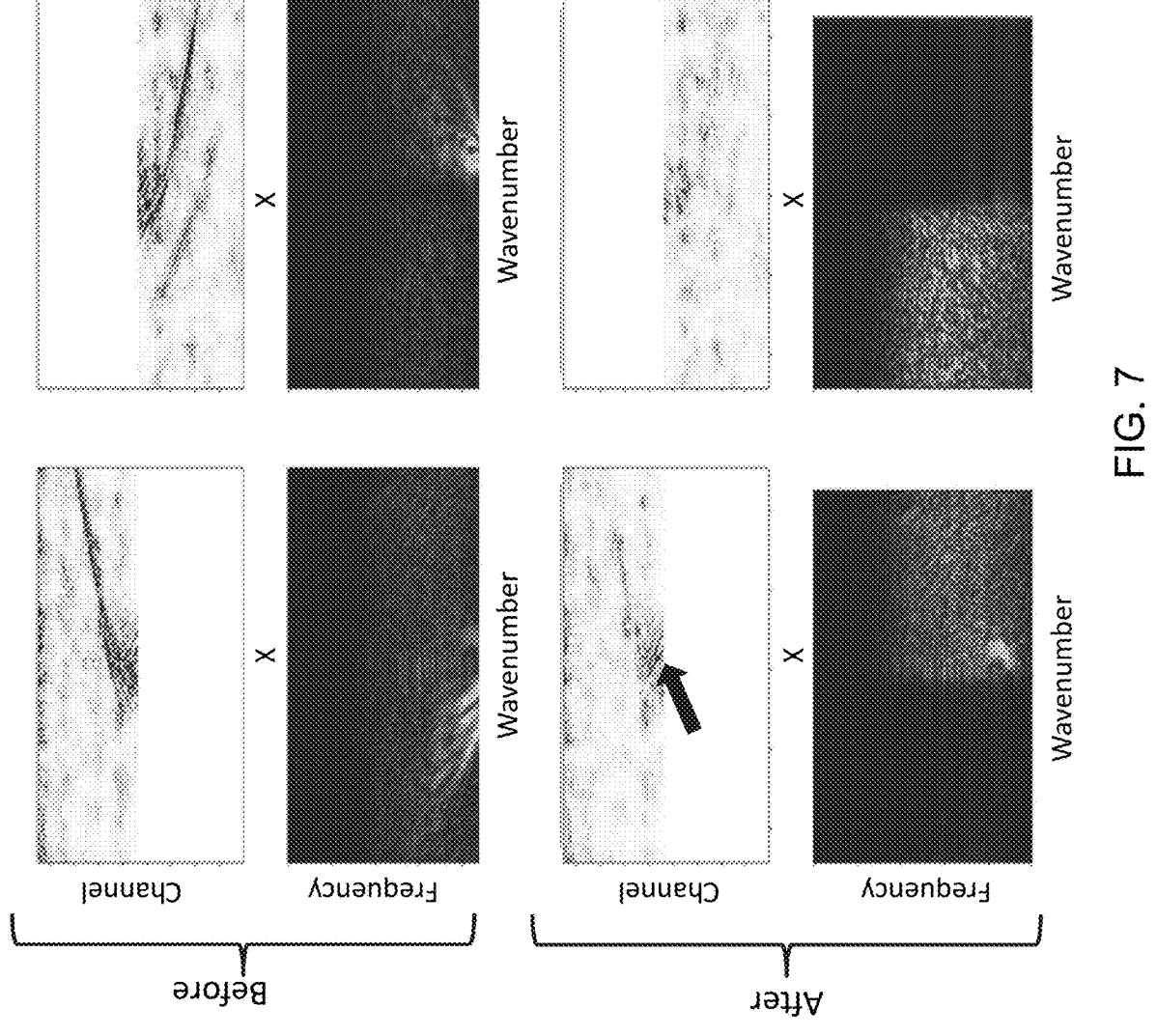
FIG. 7 shows a result of a method for identifying and displaying S-wave reflections from DAS data.

FIG. 5, FIG. 6, and FIG. 7 all show examples of process 300. In each of these, the top "Before" panels show the S-wave arrivals divided into the left and right sides, as done in step 34 of process 300. The "After" panels show the S-wave reflections that can be seen after the dip filtering has removed the direct arrivals.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method for automatically detecting shear-wave (S-wave) microseismic reflections using distributed acoustic sensing (DAS), comprising:
   a. obtaining raw DAS data collected for a subsurface volume of interest;
   b. performing passive seismic event detection and phase picking on the raw DAS data to identify passive seismic events and passive seismic event phases;
   c. extracting a passive seismic event based on the passive seismic event phase picks to generate a seismic S-wave event gather;
   d. reducing noise in the raw DAS data to generate a denoised DAS dataset;
   e. using the passive seismic S-wave event gather and the passive seismic event phases to identify an apex of a passive seismic S-wave event in the denoised DAS dataset and dividing the passive seismic S-wave event in the denoised DAS dataset into two portions based on the apex;
   f. identifying a dip of a direct arrival of the passive seismic S-wave event gather in each of the two portions;
   g. dip filtering the two portions to remove the direct arrival of the passive seismic S-wave events to generate a dip-filtered gather;
   h. generating an S-wave microseismic reflection gather based on the dip-filtered gather; and
   i. displaying the S-wave microseismic reflection gather on a graphical display.

2. The method of claim 1 wherein the passive seismic event detection and phase picking is performed by an unsupervised machine learning algorithm.

3. The method of claim 2 wherein the unsupervised machine learning algorithm includes density-based clustering.

4. The method of claim 1 further comprising using the S-wave microseismic reflection gather to characterize fractures in the subsurface volume of interest.

5. A computer system, comprising:
   one or more processors;
   memory; and
one or more programs, wherein the one or more programs are stored in the memory and configured to be executed by the one or more processors, the one or more programs including instructions that when executed by the one or more processors cause the system to automatically detect shear-wave (S-wave) microseismic reflections using distributed acoustic sensing (DAS) by:
   a. obtaining raw DAS data collected for a subsurface volume of interest;
   b. performing passive seismic event detection and phase picking on the raw DAS data to identify passive seismic events and passive seismic event phases;
   c. extracting a passive seismic event based on the passive seismic event phase picks to generate a seismic S-wave event gather;
   d. reducing noise in the raw DAS data to generate a denoised DAS dataset;
   e. using the passive seismic S-wave event gather and the passive seismic event phases to identify an apex of a passive seismic S-wave event in the denoised DAS dataset and dividing the passive seismic S-wave event in the denoised DAS dataset into two portions based on the apex;
   f. identifying a dip of a direct arrival of the passive seismic S-wave event gather in each of the two portions;
   g. dip filtering the two portions to remove the direct arrival of the passive seismic S-wave events to generate a dip-filtered gather;
   h. generating an S-wave microseismic reflection gather based on the dip-filtered gather; and
   i. displaying the S-wave microseismic reflection gather on a graphical display.

6. The system of claim 5 wherein the passive seismic event detection and phase picking is performed by an unsupervised machine learning algorithm.

7. The system of claim 6 wherein the unsupervised machine learning algorithm includes density-based clustering.

8. The system of claim 5 further comprising one or more programs including instructions that when executed by the one or more processors cause the system to use the S-wave microseismic reflection gather to characterize fractures in the subsurface volume of interest.

9. A non-transitory computer readable storage medium storing one or more programs, the one or more programs comprising instructions, which when executed by an electronic device with one or more processors and memory, cause the device to automatically detect shear-wave (S-wave) microseismic reflections using distributed acoustic sensing (DAS) by:
   a. obtaining raw DAS data collected for a subsurface volume of interest;
   b. performing passive seismic event detection and phase picking on the raw DAS data to identify passive seismic events and passive seismic event phases;
   c. extracting a passive seismic event based on the passive seismic event phase picks to generate a seismic S-wave event gather;
   d. reducing noise in the raw DAS data to generate a denoised DAS dataset;
   e. using the passive seismic S-wave event gather and the passive seismic event phases to identify an apex of a passive seismic S-wave event in the denoised DAS dataset and dividing the passive seismic S-wave event in the denoised DAS dataset into two portions based on the apex;

f. identifying a dip of a direct arrival of the passive seismic S-wave event gather in each of the two portions;

g. dip filtering the two portions to remove the direct arrival of the passive seismic S-wave events to generate a dip-filtered gather;

h. generating an S-wave microseismic reflection gather based on the dip-filtered gather; and i. displaying the S-wave microseismic reflection gather on a graphical display.

10. The non-transitory computer readable storage medium of claim 9 wherein the passive seismic event detection and phase picking is performed by an unsupervised machine learning algorithm.

11. The non-transitory computer readable storage medium of claim 10 wherein the unsupervised machine learning algorithm includes density-based clustering.

12. The non-transitory computer readable storage medium of claim 9 wherein the one or more programs further comprising instructions that when executed by the one or more processors cause the device to use the S-wave microseismic reflection gather to characterize fractures in the subsurface volume of interest.

* * * * *